Figure 1:
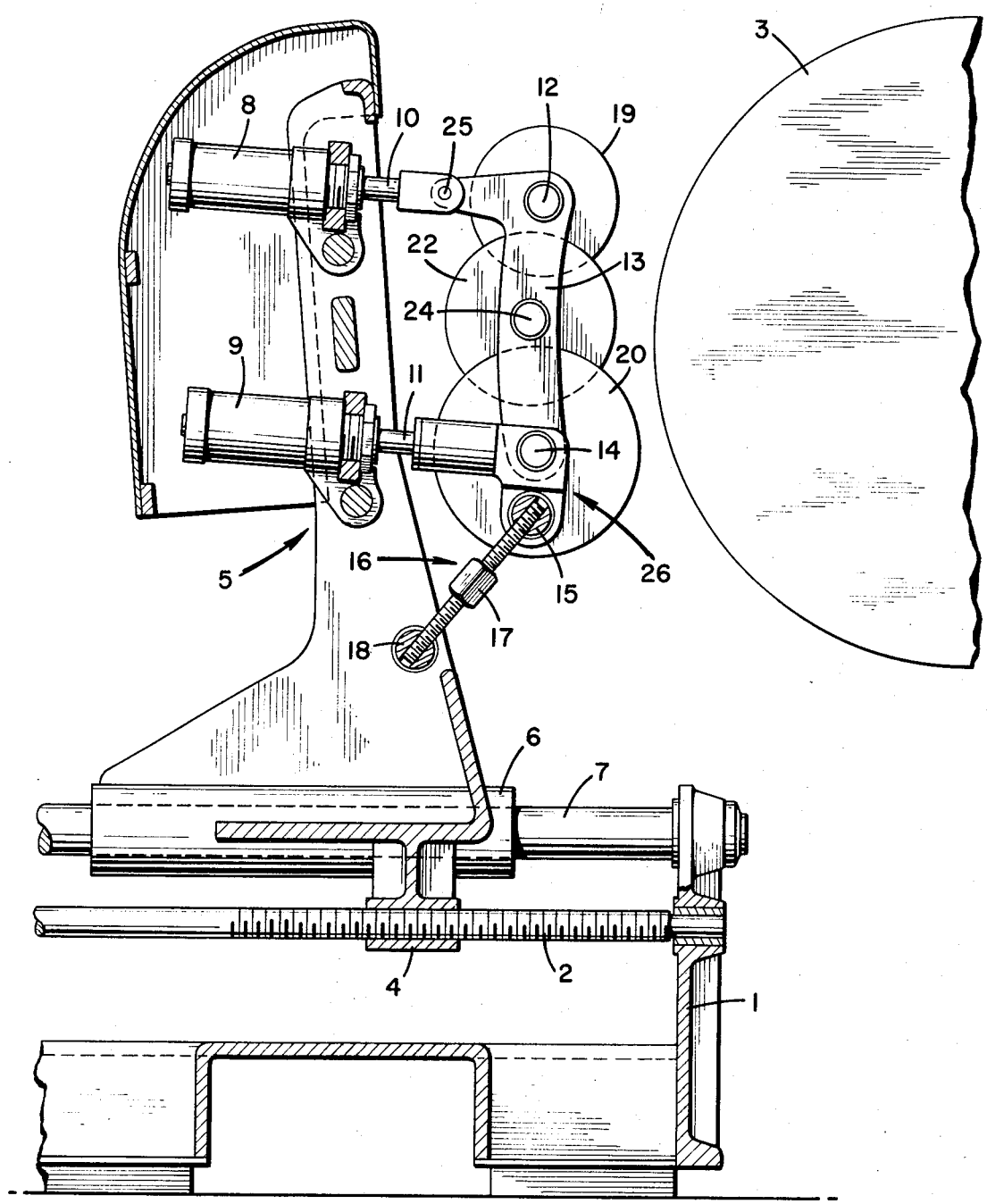

United States Patent [19]
> Caretta

[11] 3,819,449
[45] June 25, 1974

[54] STITCHING APPARATUS FOR TIRE BUILDING MACHINES AND RELATIVE STITCHING METHOD

[75] Inventor: Renato Caretta, Varese, Italy
[73] Assignee: Industrie Pirelli S.p.A., Milano, Italy
[22] Filed: Sept. 8, 1972
[21] Appl. No.: 287,491

[30] Foreign Application Priority Data
Sept. 23, 1971 Italy .................................. 28974/71

[52] U.S. Cl. ................. 156/413, 156/128, 156/421
[51] Int. Cl... B29h 17/02, B29h 17/08, B29h 17/18
[58] Field of Search ........................... 156/127–130, 156/421, 408–412, 394, 132, 135, 402, 413

[56] References Cited
UNITED STATES PATENTS

| | | | |
|---|---|---|---|
| 1,190,432 | 7/1916 | Lister | 156/406 |
| 1,657,846 | 1/1928 | Stevens | 156/410 |
| 1,715,644 | 6/1929 | Denmire | 156/408 |
| 2,396,186 | 3/1946 | McChesney | 156/409 |
| 2,681,684 | 6/1954 | Giletta et al. | 156/410 |
| 2,808,872 | 10/1957 | Clapp | 156/408 |
| 2,814,330 | 11/1957 | Vanzo et al. | 156/128 |
| 3,418,191 | 12/1968 | Dieckmann et al. | 156/130 |
| 3,535,188 | 10/1970 | Mallory et al. | 156/412 |
| 3,546,043 | 12/1970 | Miksch | 156/410 |

Primary Examiner—Clifton B. Cosby
Assistant Examiner—John E. Kittle
Attorney, Agent, or Firm—Stevens, Davis, Miller & Mosher

[57] ABSTRACT

A method and apparatus for stitching the carcass of a pneumatic tire rotating on a building drum which comprises stitching the carcass band situated astride the middle plane with a first roller and thereafter successively stitching outwardly from said middle plane with a plurality of pairs of rollers. The apparatus to perform the method comprises a base on which is supported a frame movable toward and away from the building drum. The frame supports a first roller positioned to control the carcass on the drum at the middle plane thereof and a plurality of pairs of rollers arranged symmetrically to the drum line, a pair of lever elements interconnecting all rollers and two double-acting cylinders to move the rollers into and out of contact with the drum. The axes of all rollers are parallel to the axes of the drum and to each other.

6 Claims, 8 Drawing Figures

3,819,449

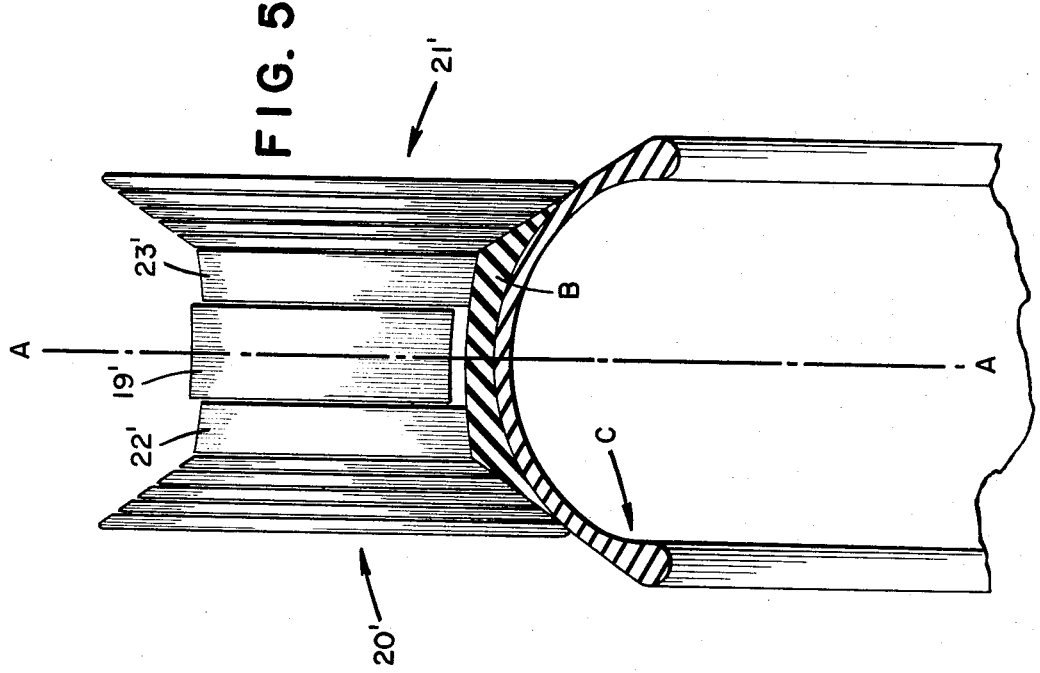
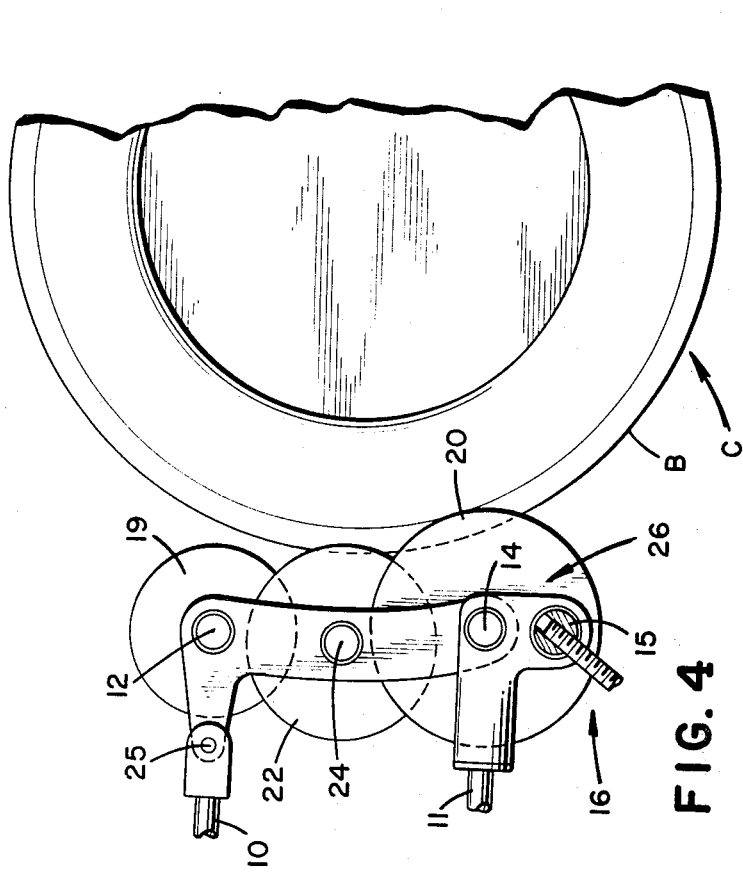
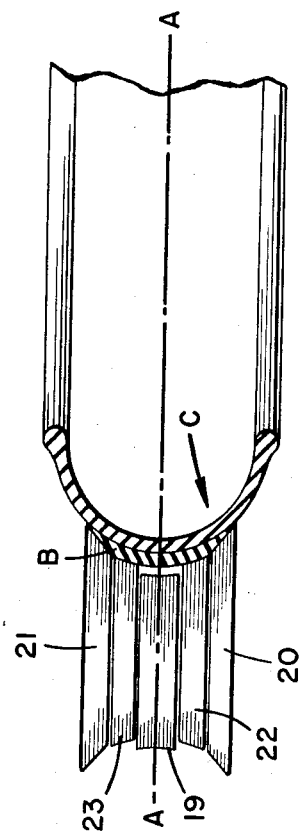

STITCHING APPARATUS FOR TIRE BUILDING MACHINES AND RELATIVE STITCHING METHOD

The present invention relates to an improved stitching apparatus, provided with rollers by means of which the necessary compactness is imparted to the carcass of a pneumatic tire placed on a building drum and ensures the perfect mutual adhesion of the various elements of rubber and of rubberized fabric which constitute it. In the present invention, the term "carcass" will indicate the uncured tire in any stage of its manufacture, e.g., after the shaping operation and the application of the tread and if a radial tire after the application of the breaker.

The most widely used type of stitching apparatus comprises one or two pairs of rollers mounted on carriages and actuated by kinematic systems, often complicated, which are constantly pressed against the carcass rotating about its own axis on the building drum and then, displaced in a direction parallel to said axis, symmetrically, from the middle plane towards the drum shoulders. The trajectories carried out by the rollers on the carcass are consequently two helical trajectories.

It follows that, even if the "pitch" of said helical trajectories is very small and even if the speed of axial translation of the rollers is well correlated with the speed of rotation of the carcass some parts of the carcass may remain unstitched, so that air may be trapped between the various elements constituting the carcass.

Moreover, even if the pressure exerted by the rollers on the carcass is not very high, on account of the physical characteristics of the rubber before curing, i.e., the plasticity, an unavoidable accumulation of rubber takes place in the lateral zones in which the stitching terminates, with a consequent increase in the width of the elements subjected to stitching.

The present invention seeks to provide a stitching method and a stitching apparatus able to carry out said method, by means of which such disadvantages are eliminated.

In particular, a highly undesirable increase in the width of the tread is eliminated with respect to the width it has at its emersion from the extruder and when it is wound up about the building drum.

Accordingly, an object of the present invention is to provide a method for stitching the carcass of a pneumatic tire, rotating on a building drum, from the middle plane towards the drum shoulders, by means of rotatable rollers whose axis is parallel to the drum axis and which can move only in planes perpendicular to the drum axis. The method is characterized in that a carcass band situated astride said middle plane is at first stitched with a first roller and then said carcass band is stitched, symmetrically with respect to said middle plane and in succession, with a plurality of pairs of rollers according to a pre-established sequence.

In order to better illustrate the present invention by way of non-limiting example, reference is made to the Figures of the attached drawings, in which:

FIG. 1 represents a side view of the stitching apparatus;

FIGS. 2, 3, 4 and 2A, 3A, and 4A represent three phases of the operation of the stitching apparatus, respectively in side view and in top view; and FIG. 5 represents a top view of another embodiment of the stitching apparatus.

A base 1, fixed to the ground, contains the bearings of a threaded shaft 2, horizontally lying in a direction orthogonal to the axis of a tire building drum 3, whose axis also is horizontal.

A lead screw nut 4, fastened to a vertical frame 5, engages the threaded portion of shaft 2. The lower part of the vertical frame contains two hollow mandrels 6 only one of which is visible in FIG. 1, but each of which is slidable on a cylindrical bar 7.

In carrying out the stitching of the tire carcass, the frame 5 is moved away from the axis of drum 3 or towards it by actuating shaft 2 either manually or by means of an appropriate motor-reducer (not illustrated).

The upper part of frame 5 carries, pivoted to it, two double-acting cylinders 8 and 9 positioned one above the other. The stems of the two cylinders, respectively 10 and 11, project from them at their side directed towards drum 3.

The end of stem 10 is hinged to a pin 25 connecting one arm of each of two levers 13 disposed side-by-side and have the shape of an L. The other longer arm of each lever is shaped as an arc of circle.

Stem 11 is integral with one end of a square 26 which is hinged on a second pin 14 connecting the same two levers 13 and situated at the lower end thereof.

The square 26 permits the levers 13 to be rigidly connected to frame 5 by means of a strut 16 which is constituted of two parts, threaded in opposite directions and made fast by means of a threaded sleeve 17. A part of the strut 16 is in fact screwed on a pivot 15 which is situated at the lower end of square 26, while the other part is screwed on a pivotable projection 18 of frame 5. By means of sleeve 17 it is possible to lengthen or to shorten strut 16 by rotating sleeve 17 in one direction or the other.

Figure 2:
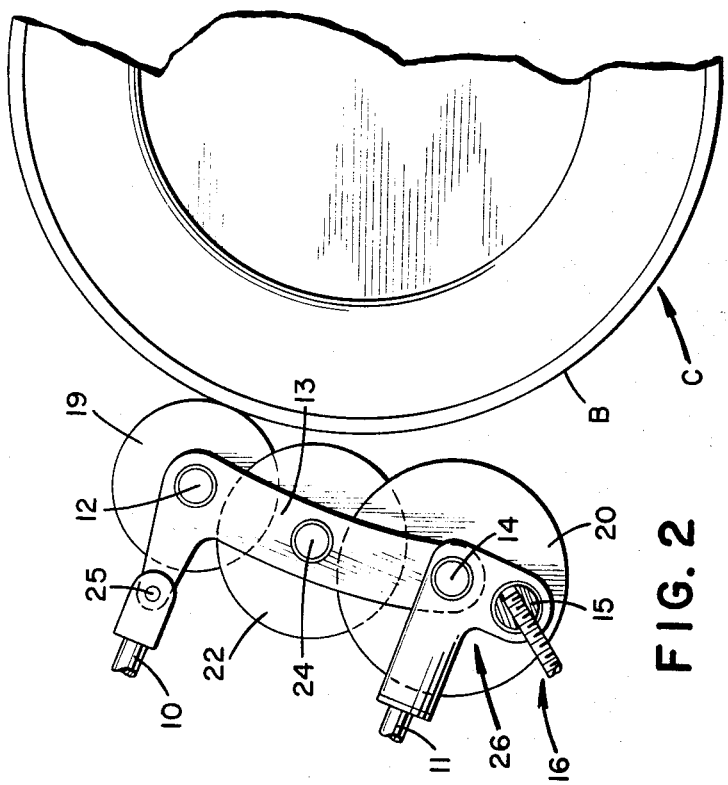
Figure 2A:
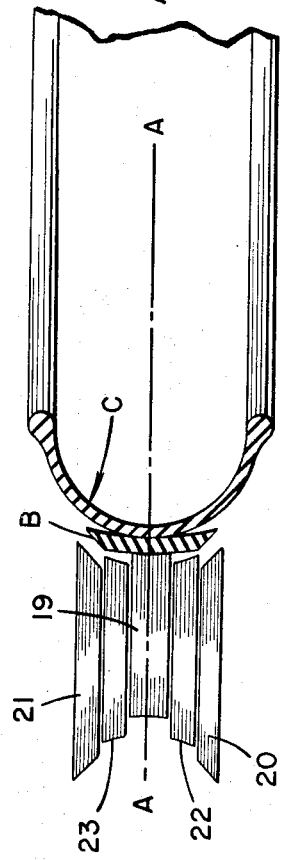

A first roller 19, arranged between the two levers 13, is pivoted on a connecting pivot 12 situated at the point of crossing of the two arms of levers 13. Roller 19 has its axis parallel to that of drum 3 and is placed at the middle plane A—A of the drum itself, (FIG. 2A). Moreover, two pairs of rollers, respectively 20 and 21, 22 and 23, whose axes are all parallel to one another and to the axis of drum 3, are arranged between the two levers 13, symmetrically with respect to the middle plane A—A. Rollers 20 and 21 are identical and are both pivoted on the connecting pivot 14. Rollers 22 and 23 are identical and are both pivoted on another connecting pivot 24 of the two levers 13.

For stitching tread B of a carcass C arranged on the building drum 3, the stitching apparatus operates as follows:

By actuating the motor-speed reducer, shaft 2 is caused to rotate thereby moving lead screw nut 4 and frame 5 toward the axis of the building drum 3. In this way the position of the stitching apparatus is adjusted to the maximum outer diameter of tread B.

Then the position of the group of rollers is adjusted by regulating the length of strut 16 by means of the threaded sleeve 17. The function of strut 16 is also that of supporting the group of rollers, since it is the only rigid connection between them and the frame 5.

At the moment, the building drum 3 is rotated, the pre-established working sequence is started by actuating upper cylinder 8. On account of the thrust exerted by stem 10 on pivot 25, the two levers 13, fastened to the group of rollers, move in planes perpendicular to the drum axis. Therefore roller 19 approaches tread B of carcass C and is maintained pressed against it by the action of stem 10.

In consequence of the rotation of carcass C together with drum 3, it is possible to stitch a band of the tread situated astride the middle plane A—A.

When roller 19 finishes its stitching work, lower cylinder 9 is actuated, so that stem 11 carries out the first portion of its stroke. As stem 10 continues with its pressing action and roller 19 is pressed on tread B the two levers 13 rotate now about pivot 12 together with the group of rollers, which do remain always in planes perpendicular to the axis of drum 3.

Figure 3:
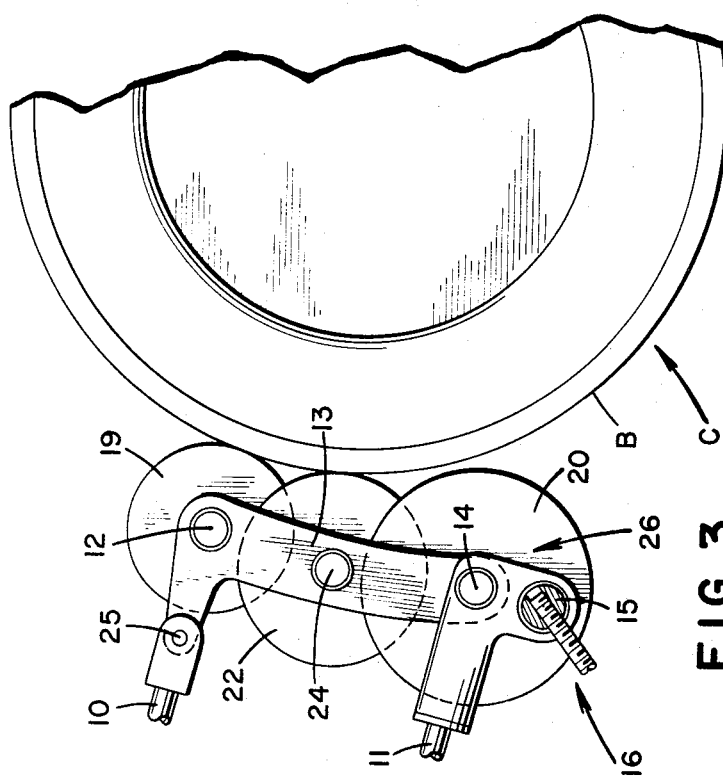
Figure 3A:
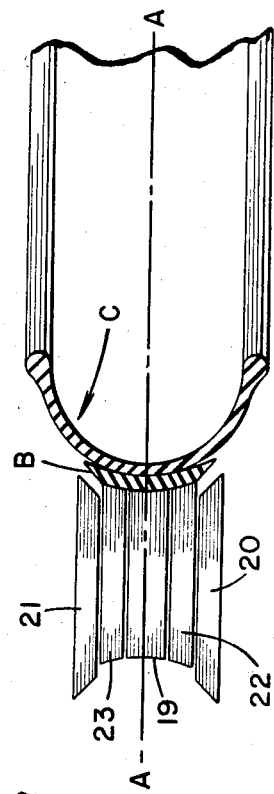

This approach lasts until rollers 22 and 23 are pressed on tread B. Thereafter for a certain time, it is possible to stitch, besides the band astride plane A—A, also two bands of tread situated at the two sides of it, symmetrically with respect to plane A—A (FIGS. 3 and 3A).

After some seconds of simultaneous stitching, carried out by roller 19 and by the first pair of rollers 22 and 23, the lower cylinder 9 is again actuated, so that stem 11 effects also the remaining part of its stroke. As roller 19 has a diameter smaller than that of rollers 22 and 23, and as the two levers 13 do not have a rectilinear shape, but shaped as two arcs of a circle having a diameter greater than that of drum 3 and which are not concentric with the drum itself, a rotation of the two levers 13 about pivot 24 is begun. By means of this rotation, the second pair of rollers 20 and 21 which are always in planes perpendicular to the axis of drum 3, approaches tread B. The rollers are thereafter pressed thereagainst. Rollers 20 and 21 begin to touch the tread after roller 19 has been removed therefrom. While the first pair of rollers 22 and 23 continues its stitching action, rollers 20 and 21 of the second pair effect the stitching for which they are provided, namely that of the two bands of the tread, disposed symmetrically with respect to plane A— A, and axially farther from it than the two bands stitched by rollers 22 and 23 (FIGS. 4 and 4A).

In this embodiment, the axial width of tread B is such that, to stitch it completely, central roller 19 and pairs of rollers 20 and 21, 22 and 23 are sufficient. However, if a large-size tire is placed on the building drum for stitching, the present stitching apparatus can comprise additional pairs of rollers. At the end of the stitching operation, when the rotation of drum 3 is stopped, cylinders 8 and 9 are actuated so that stems 10 and 11 retract levers 13, together with the whole group of rollers from tread B. Subsequently the motor-speed reducer is actuated to operate in a direction opposite to that it had at the beginning. Consequently it provides for the detachment of frame 5 from drum 3. In this way it is possible to leave a free space which allows the operator to remove the completely finished carcass from the drum.

The pre-established sequence according to which the various pairs of rollers come into action can be such that all of the rollers are never pressed on the carcass at the same time, and in particular that more than two pairs of rollers are never operating at the same time.

However, it is also possible to carry out the stitching apparatus in such a way that each of the various pairs of rollers enters into action when all the rollers which precede it in the pre-established sequence of operation are still pressed on the carcass. In this way, at the end of the whole stitching operation, each group of rollers stops simultaneously its own action and is then detached by means of the double-acting cylinders 8 and 9.

It is necessary to follow the indicated sequence, to ensure that the stitching is carried out first on the band situated astride the middle plane, and then progressively from it, in order to eliminate any air which may have remained trapped in the carcass below the tread during the manufacturing operation.

The present stitching apparatus can also be carried out by adapting rollers to a profile appropriate for effecting the stitching of the whole carcass, instead of the mere stitching of the tread, even before said carcass is shaped.

The condition to be complied with for a correct stitching is that the rollers which are not motor-actuated may have, along their whole lateral surface, the same peripheral speed as the bands of tread which are stitched by them. However, in the zones farthest from the middle plane A—A where the tread suddenly varies in diameter the condition is respected only in one point of the tread profile.

As can be seen from FIG. 5, it is possible to avoid this disadvantage by making the pair of rollers 20' and 21', which are axially the farthest from plane A—A, in the form of two packages of very thin discs, while the first roller 19' and the other pair of rollers 22' and 23' are the same as those of the preceding embodiment. The discs constituting each of said rollers are axially separated from one another by means of a number of suitable spacing elements not shown. The outer diameter of these discs is such that they, in their whole, follow substantially the profile of tread B of carcass C. Therefore, the discs rotate independently of one another, and said condition of the peripheral speeds being equal is consequently respected.

The present stitching apparatus also can operate with carcasses of various types mounted on the building drum. It is easy to replace one group of rollers with others having the same thickness, but a different profile or diameter. In fact, when the stitching apparatus is not working, it is sufficient to disengage the various pivots which connect the two levers 13 to each other and to detach square 26 to carry out a quick replacement.

Further, it is possible to provide automatic systems to start the central roller and the various pairs of rollers according to the pre-established sequence. Conveniently, a tape fed programmer can be used.

Even if the present invention has been described with reference to a preferred embodiment, and hint has been made to possible alternative embodiments, it is understood that it covers all the modifications deriving from the above indicated inventive concept.

What is claimed is:

1. A stitching apparatus for stitching the carcass of a tire placed into rotation on a building drum, which comprises a frame on a base, said frame being movable toward and away from the drum axis, said frame supporting a first roller situated at the middle plane of the drum and arranged with its axis parallel to the drum axis, and a plurality of pairs of rollers, arranged symmetrically to the drum midline and having their axes all parallel to one another and to the drum axis, and means on said frame to move said rollers into and out of stitching position with said drum, said rollers being supported on said frame in such a way that no more than two pairs of rollers operate at the same time the central stitching roller adapted to first contact the central crown of the tire with the pairs of rollers progressively contacting the tread at axially outward positions therefrom, subsequent to applying the central roller.

2. The stitching apparatus of claim 1 wherein said plurality of pairs of rollers is constituted of two pairs of rollers, the axes of which are connections for two levers, disposed side-by-side, said levers also being connected to each other by the axis of the first roller.

3. The stitching apparatus of claim 2 wherein one end of each of the two levers disposed side-by-side and the pivot connecting the pair of rollers which is axially the farthest from the midline of the building drum are hinged to the ends of two elements of adjustable length.

4. The stitching apparatus of claim 3 wherein said elements are two double-acting cylinders pivoted on the frame.

5. The stitching apparatus of claim 2 wherein the other end of the levers carries a square, the lower end of which is secured to a pivot on which is pivoted one part of a strut constituted by two parts of variable length, the other part of said strut being screwed on a projection provided on the frame.

6. The stitching apparatus of claim 1 wherein at least some rollers are each constituted by a package of very thin discs which are mounted on their own pivots in such a way as to be free to rotate independently of one another, said discs having such a diameter that, in their whole, they follow substantially the profile of the band of tread they are intended to stitch.

* * * * *